(12) United States Patent
Yanagida et al.

(10) Patent No.: US 7,460,934 B2
(45) Date of Patent: Dec. 2, 2008

(54) POWER LINE COMMUNICATION SYSTEM

(75) Inventors: Yo Yanagida, Shizuoka-ken (JP);
Terumitsu Sugimoto, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 488 days.

(21) Appl. No.: 11/370,931

(22) Filed: Mar. 9, 2006

(65) Prior Publication Data
US 2006/0224278 A1    Oct. 5, 2006

(30) Foreign Application Priority Data
Mar. 31, 2005    (JP)    ............... 2005-104281

(51) Int. Cl.
*H04L 27/00*    (2006.01)
*H04Q 1/30*    (2006.01)

(52) U.S. Cl. ............... 701/1; 701/36; 340/538

(58) Field of Classification Search ............... None
See application file for complete search history.

(56) References Cited

U.S. PATENT DOCUMENTS

| | | | | |
|---|---|---|---|---|
| 5,592,485 | A * | 1/1997 | Consiglieri et al. ............ 340/2.1 |
| 7,352,282 | B2 * | 4/2008 | Yanagida et al. ............ 340/538 |
| 2003/0076221 | A1 * | 4/2003 | Akiyama et al. ............ 340/310.01 |
| 2003/0195668 | A1 * | 10/2003 | Radtke et al. ............ 701/1 |
| 2004/0207262 | A1 * | 10/2004 | Yanagida et al. ............ 307/10.1 |
| 2006/0061329 | A1 * | 3/2006 | Dawson ............ 320/115 |

\* cited by examiner

*Primary Examiner*—Michael J. Zanelli
(74) *Attorney, Agent, or Firm*—Finnegan, Henderson, Farabow, Garrett & Dunner, L.L.P.

(57) ABSTRACT

A power line communication system includes a master ECU for supplying electric power, a plurality of slave ECUS and a plurality of power-supply lines connecting the slave ECUS to the master ECU respectively. The power-supply lines including at least one first power-supply line on which a control signal is superimposed and at least one second power-supply line on which no control signal is superimposed. The control signal is superimposed on the first power-supply line by the master ECU and also communicated between the master ECU and the slave ECUS connected to the first power-supply line. Impedance per unit length of the first power-supply line is set smaller than impedance per unit length of the second power-supply line.

7 Claims, 3 Drawing Sheets

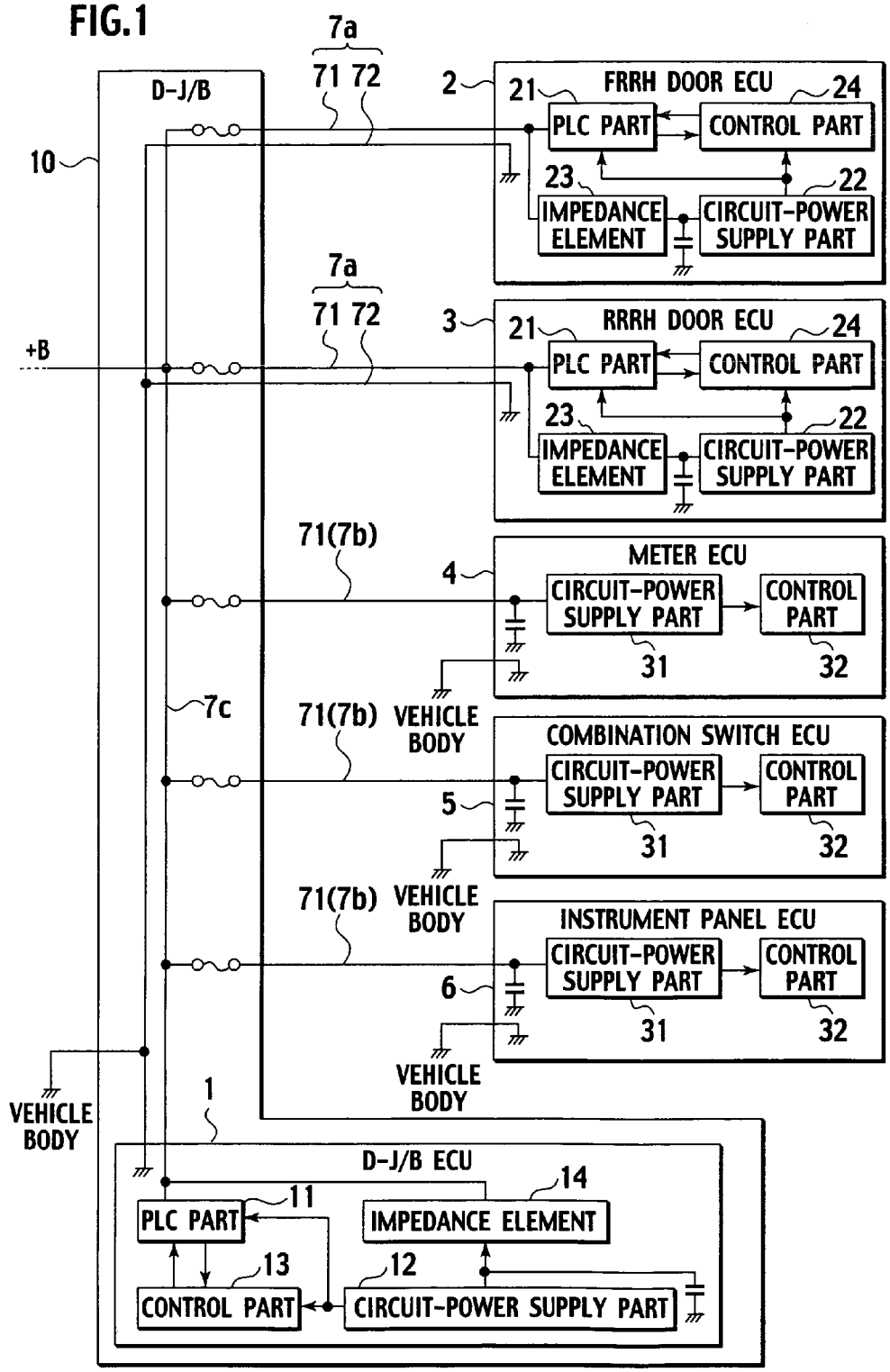

POWER LINE COMMUNICATION SYSTEM

BACKGROUND OF THE INVENTION

The present invention relates to a power line communication (PLC) system and particularly, to a technique of improving communication efficiency by preventing a damping of control signals superimposed on a power-supply line.

In general, built-in vehicle mountable instruments, such as various sensors and loads, are controlled by electronic control units in the vicinity of the instruments, respectively. Note that each of these electronic control units will be referred to as "slave ECU" below. In connection, the electronic control units will be referred to as "slave ECUS" below, as plural.

For instance, in case of a motor for powered window, a door ECU in the vicinity of a vehicle door is adapted so as to supply the motor with electric power and control rotation of the motor.

These slave ECUS are all connected to a main electronic control unit through wire harnesses. The main electronic control unit supplies these slave ECUS with electric power through wire harnesses (power-supply lines). Note that the main electronic control unit will be referred to as "master ECU" below.

In order to reduce the number of wire harnesses connecting these ECUS to each other, there is recently proposed a power-superimposed multiplex communication method, alias name, PLC (Power Line Communication) transmission method where control signals are superimposed on wire harnesses for power supply to communicate the signals between a master ECU and each slave ECU, being in the course of practical application.

According to the PLC transmission method, high-frequency signals are processed with ASK (Amplitude Shift Keying) modulation to produce signals in the form of "0" and "1" and successively, the resultant signals are superimposed on a power-supply line, transmitting both electric power and control signals.

Then, in the slave ECU, a PLC circuit samples the control signals superimposed on the power-supply line and demodulates the control signals based on sampling values, performing a control based on the so-demodulated control signals.

While, the master ECU is generally connected to a plurality of slave ECUS or loads through wire harnesses and is constructed so as to allow electrical power to be supplied to these elements via the wire harnesses. Here, it is noted that the control signals aren't always superimposed on all of the power-supply lines connected to the master ECU. That is, there exist some slave ECUS or loads to which only the electrical power is supplied through the power-supply lines.

In this way, the power-supply lines connected to the master ECU comprises ones having the control signals superimposed thereon and the others having no control signal superimposed thereon. Consequently, there is the possibility that the control signal after ASK modulation flows from one power-supply line having the control signal thereon into another power-supply line having no superimposed control signal, so that the control signal on the former power-supply line is attenuated to deteriorate communication efficiency.

SUMMARY OF THE INVENTION

As mentioned hereinabove, since the conventional PLC system includes a plurality of slave ECUS or loads connected to a master ECU through power-supply lines, a control signal on a power-supply line having the control signal superimposed thereon is attenuated to deteriorate communication efficiency of the system.

Under the circumstances, it is therefore an object of the present invention to provide a PLC system capable of preventing a damping of control signals thereby to establish effective communication between a master station and slave stations.

The object of the present invention described above can be accomplished by a power line communication system comprising: a master station for supplying electric power; a plurality of slave stations driven by the electric power; and a plurality of power-supply lines connecting the slave stations to the master station respectively, the power-supply lines including at least one first power-supply line on which a control signal is superimposed and at least one second power-supply line on which no control signal is superimposed, wherein the control signal is superimposed on the first power-supply line by the master station and also communicated between the master station and at least one slave station connected to the first power-supply line, and impedance per unit length of the first power-supply line is set smaller than impedance per unit length of the second power-supply line.

In the above constitution, as it is established so that the impedance per unit length of the first power-supply line is set smaller than the impedance per unit length of the second power-supply line, it is possible to prevent the control signal from entering the power-supply line connecting the master station with a slave station in non-communication with the master station. Therefore, it becomes possible to transmit the control signal between the master station and a slave station as a mating partner effectively.

According to the second aspect of the invention, each of the power-supply lines comprises two wires forming a power line and a grounding line, and the first power-supply line is wired so that an interval between the power line and the grounding line of the first power-supply line becomes smaller than an interval between the power line and the grounding line of the second power-supply line.

In the second aspect of the invention, since the interval between the power line and the grounding line of the first power-supply line is preset smaller than the interval between the power line and the grounding line of the second power-supply line, the impedance per unit length of the first power-supply line becomes smaller than the impedance per unit length of the second power-supply line. Thus, it is possible to control respective impedance of both power-supply lines with ease.

According to the third aspect of the invention, each of the power-supply lines comprises two wires forming a power line and a grounding line and interposes a connector arranged in at least one position in a wiring route between the master station and each of the slave stations, the connector having a number of connect pins, and an interval between the connect pin for the power line and the connect pin for the grounding line in the connector interposed in the first power-supple line is smaller than an interval between the connect pin for the power line and the connect pin for the grounding line in the connector interposed in the second power-supple line.

In the third aspect of the invention, since the interval between the connect pin for the power line and the connect pin for the grounding line in the connector interposed in the first power-supple line is smaller than the interval between the connect pin for the power line and the connect pin for the grounding line in the connector interposed in the second power-supple line, it is possible to make impedance of one transmission channel having the control signal superimposed thereon smaller than impedance of another transmission channel having no control signal superimposed thereon, whereby the communication efficiency for the control signal can be improved.

According to the fourth aspect of the invention, each of the power-supply lines comprises two wires forming a power line and a grounding line, the master station includes a base plate provided with wiring patterns of the power-supply lines connecting the master station with the slave stations, and an interval between the power line and the grounding line in the wiring pattern associated with the first power-supple line is smaller than an interval between the power line and the grounding line in the wiring pattern associated with the second power-supple line.

In the fourth aspect of the invention, since the interval between the power line and the grounding line in the wiring pattern associated with the first power-supple line is smaller than the interval between the power line and the grounding line in the wiring pattern associated with the second power-supple line, it is possible to make impedance of one transmission channel having the control signal superimposed thereon smaller than impedance of another transmission channel having no control signal superimposed thereon, whereby the communication efficiency for the control signal can be improved.

According to the fifth aspect of the invention, each of the power-supply lines comprises two wires forming a power line and a grounding line, and the grounding line of the second power-supply line is formed by a vehicle body.

In the fifth aspect of the invention, with the adoption of the vehicle body as the grounding line, it is possible to reduce the number of wires forming the power-supply lines.

According to the sixth aspect of the invention, the master station is formed by an in-vehicle electronic control unit, and the slave stations are formed by either loads or load control units, which are driven by the electric power supplied from the in-vehicle electronic control unit through the power-supply lines.

In the sixth aspect of the invention, with the application on communication among in-vehicle ECUS or between an ECU and a load, it is possible to perform power-superimposed multiplex communication (PLC) in the vehicle effectively.

According to the seventh aspect of the invention, in the power line communication system of the sixth aspect, the first power-supply lines comprises two wires forming a power line and a grounding line, and the second power-supply line comprises a power line and a grounding line using a vehicle body.

In the seventh aspect of the invention, with the adoption of the vehicle body as the grounding line, it is possible to reduce the number of wires forming the power-supply lines, as similar to that in the fifth aspect.

These and other objects and features of the present invention will become more fully apparent from the following description and appended claims taken in conjunction with the accompany drawings.

BRIEF DESCRIPTION OF THE DRAWINGS

FIG. 1 is a block diagram showing a constitution of a power line communication system in accordance with an embodiment of the present invention;

DESCRIPTION OF THE PREFERRED EMBODIMENT

Figure 2A:
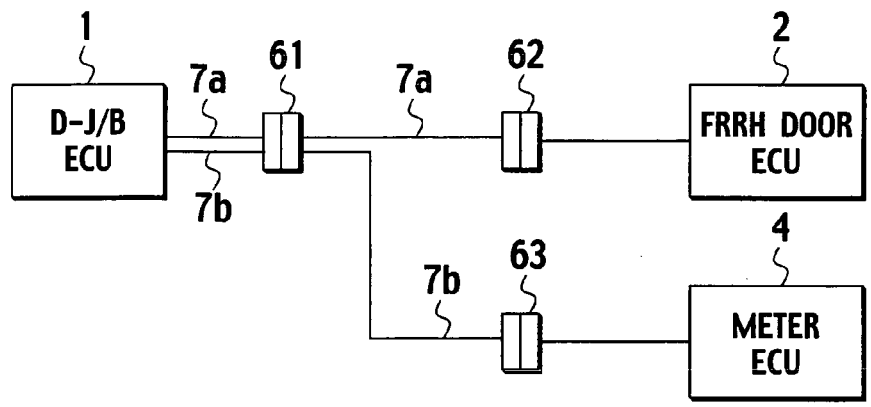
FIGS. 2A to 2D are views each explaining a condition that power lines are connected to each other through a connector, in accordance with a first modification of the present invention.

An embodiment of the present invention will be described with reference to the drawings. FIG. 1 is a block diagram showing a constitution of a power line communication system in accordance with one embodiment of the present invention. In this embodiment, an explanation will be illustrated by citing the example of a communication system among in-vehicle electronic control units (ECUS) as one example of the power line communication system.

In FIG. 1, the shown power line communication system includes a master electronic control unit (ECU) 1 forming a master station and a plurality of slave ECUS 2~6 forming slave stations. For instance, the master ECU 1 is formed by an electronic control unit arranged in a conjunction box (D-J/B) on the side of a driver's seat (not shown). While, in the slave ECUS 2~6, the ECU 2 is in charge of controlling a FRRH door, the ECU 3 in charge of controlling a RRRH door, the ECU 4 in charge of controlling meters, the ECU 5 in charge of controlling combination switches and the ECU 6 is in charge of controlling an instrument panel.

The master ECU 1 and the slave ECUS 2~6 are connected to each other through the intermediary of power-supply lines 7a, 7b: first power-supply lines 7a and second power-supply lines 7b. In these lines, the power-supply line 7a connecting the ECU 2 (ECU 3) with the master ECU 1 is composed of two wires: a power line 71 and a grounding line 72. The power line 71 is connected to a positive-B (+B) terminal of a battery, while the grounding line 72 is connected to ground. Through the power-supply lines 7a, electric power is transmitted from the master ECU 1 to the slave ECUS 2, 3. Additionally, in accordance with PLC (Power Line Communication) transmission method, control signals are superimposed on the power-supply lines 7a and further transmitted to the ECUS 2, 3.

While, the power-supply lines 7b connecting the ECU 4 (ECU 5, ECU 6) with the master ECU 1 includes a power line 71 connected to the positive-B terminal of the battery. A ground point of the power-supply line 7b is connected to a vehicle body. Through the power-supply lines 7b, electric power is transmitted from the master ECU 1 to the ECUS 4~6.

Comparing the power-supply line 7a with the power-supply line 7b, the power-supply line 7a having two lines 71, 72 has impedance per unit length smaller than that of the power-supply line 7b having the ground point connected to the vehicle body. Thus, assuming that respective distances between the master ECU 1 and the slave ECUS 2~6 are equal to each other, it is established that the power-supply line 7a having the power line 71 and the grounding line 72 has a smaller impedance than the power-supply line 7b having the single power line 71.

Each of the slave ECUS 2, 3 performing PLC (Power Line Communication) transmission method includes a PLC part 21, a circuit power-supply part 22 producing a designated level of power supply voltage from the electric power transmitted through the power-supply line 7a, impedance element 23 arranged ahead of the circuit power-supply part 22 to suppress entering of control signals into the circuit power-supply part 22 and a control part 24 performing a variety of controls by the power supply voltage supplied from the circuit power-supply part 22.

The PLC part 21 samples the control signals superimposed on the power-supply line 7a at regular intervals into demodulation and further outputs so-demodulated signals to the control part 24. When transmitting the control signal to the master ECU 1, the PLC part 21 applies ASK (Amplitude Shift Keying) modulation on the control signals outputted from the control part 24. Further, the PLC part 21 superimposes the so-modulated control signals on the power-supply line 7a.

On the other hand, each of the slave ECUS 4~6 performing no PLC transmission method includes a circuit power-supply part 31 producing a designated level of power supply voltage from the electric power transmitted through the power-supply line 7b and a control part 32 performing a variety of controls by the power supply voltage supplied from the circuit power-supply part 31.

The master ECU 1 includes a PLC part 11, a circuit power-supply part 12 producing a designated level of power supply voltage from a battery power supplied through a power-supply line 7c, an impedance element 13 arranged ahead of the circuit power-supply part 12 to suppress entering of control signals into the circuit power-supply part 12 and a control part 14 performing a variety of controls by the power supply voltage supplied from the circuit power-supply part 12.

The PLC part 11 samples the control signals transmitted from the slave ECUS 2, 3 and also superimposed on the power-supply line 7a at regular intervals into demodulation and further outputs so-demodulated signals to the control part 14. When transmitting the control signals to the slave ECUS 2, 3, the PLC part 11 processes the control signals outputted from the control part 14 with ASK modulation on and further superimposes them on the power-supply line 7c.

The above-constructed PLC system of this embodiment operates as follows.

As mentioned before, according to the embodiment, it is established that the power-supply lines 7a connected to the ECUS 2, 3 performing PLC transmission method have a smaller impedance than those of the power-supply lines 7b connected to the ECUS 4~6 performing no PLC transmission method.

Accordingly, if control signals are superimposed on the power-supply lines 7c at the PLC part 11 in the master ECU 11, then the control signals are transmitted to the ECU 2, 3 through the power-supply lines 7a of smaller impedance. While, as the power-supply lines 7b are provided with larger impedance respectively, the damping effect of bypass condensers in the ECUS 4~6 on the control signals is suppressed small. Consequently, it is possible to improve efficiency of transmitting the control signals to the ECUS 2, 3.

In the above way, since each of the power-supply lines 7b connecting the ECU 1 with the ECUS 4~6 performing no PLC transmission method has a larger impedance per unit length than that of each of the power-supply lines 7a connecting the master ECU 1 with the ECUS 2, 3 performing PLC transmission method, it is possible to suppress a damping of the control signals by the ECUS 4~6 performing no PLC transmission method, whereby the transmission efficiency of the control signals between the main ECU 1 and the ECUS 2, 3 performing PLC transmission method can be improved.

In the above-mentioned embodiment, each of the power-supply lines 7b connected to the ECUS 4~6 performing no PLC transmission method is formed by only the power line 71 while connecting the ground point to the vehicle body. In connection, each of the power-supply line 7b may be composed of the power line 71 and a grounding line (not shown) similar to the grounding line 72 for the ECU 2 (3). In this case, however, it is required to make an interval between the power line 71 and the grounding line larger than the interval between the power line 71 and the grounding line 72 for the ECU 2. Then, with the arrangement, it becomes possible to make impedance of the power-supply line 7b larger than that of the power-supply line 7a, producing the similar effect to the above-mentioned embodiment.

Next, a first modification of the above embodiment will be described. FIGS. 2A to 2D are views explaining the first modification of the PLC system of the embodiment, showing connections between the master ECU 1 and the ECUS 2, 4. According to the first modification, as shown in FIG. 2A, there are arranged, between the master ECU 1 and two slave ECUS 2, 4, three connectors 61, 62, 63 each having a plurality of connecting pins (i.e. multiple pin connectors). Note that in the first modification, the power-supply line 7b is formed by two lines: a power line and a grounding line. That is, the ground point of the power-supply line 7b is not connected to a vehicle body.

Figure 2B:
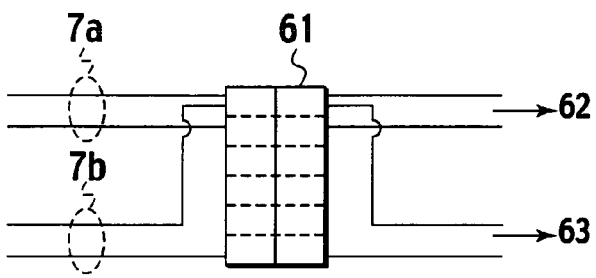

As shown in FIG. 2B, in the connector 61, two wires forming the power-supply line 7a performing PLC transmission method are connected to the corresponding wires through adjacent pins in the connector 61. While, the power-supply line 7b performing no PLC transmission method are connected to the corresponding lines through separate pins in the connector 61.

Figure 2C:
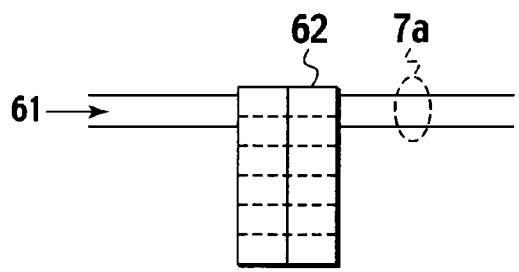

As shown in FIG. 2C, in the connector 62 for the power-supply line 7a connected to the ECU 2 performing PLC transmission method, two wires forming the power-supply line 7a are connected to the corresponding wires through adjacent pins in the connector 62.

Figure 2D:
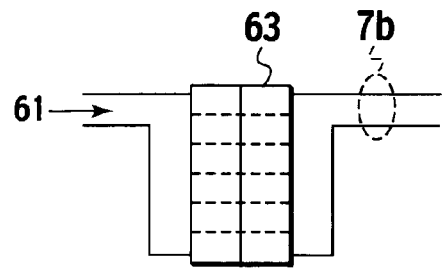

As shown in FIG. 2D, in the connector 63 for the power-supply line 7b connected to the ECU 4 performing no PLC transmission method, two wires forming the power-supply line 7b are connected to the corresponding wires through separate pins in the connector 63.

Accordingly, impedance at the connectors 61, 62 in a transmission channel between the ECU 1 and the ECU 2 becomes smaller than that at the connectors 61, 63 in another transmission channel between the ECU 1 and the ECU 4. As a result, it is possible to improve the transmission efficiency of the control signal superimposed on the power-supply line 7a.

Figure 3:
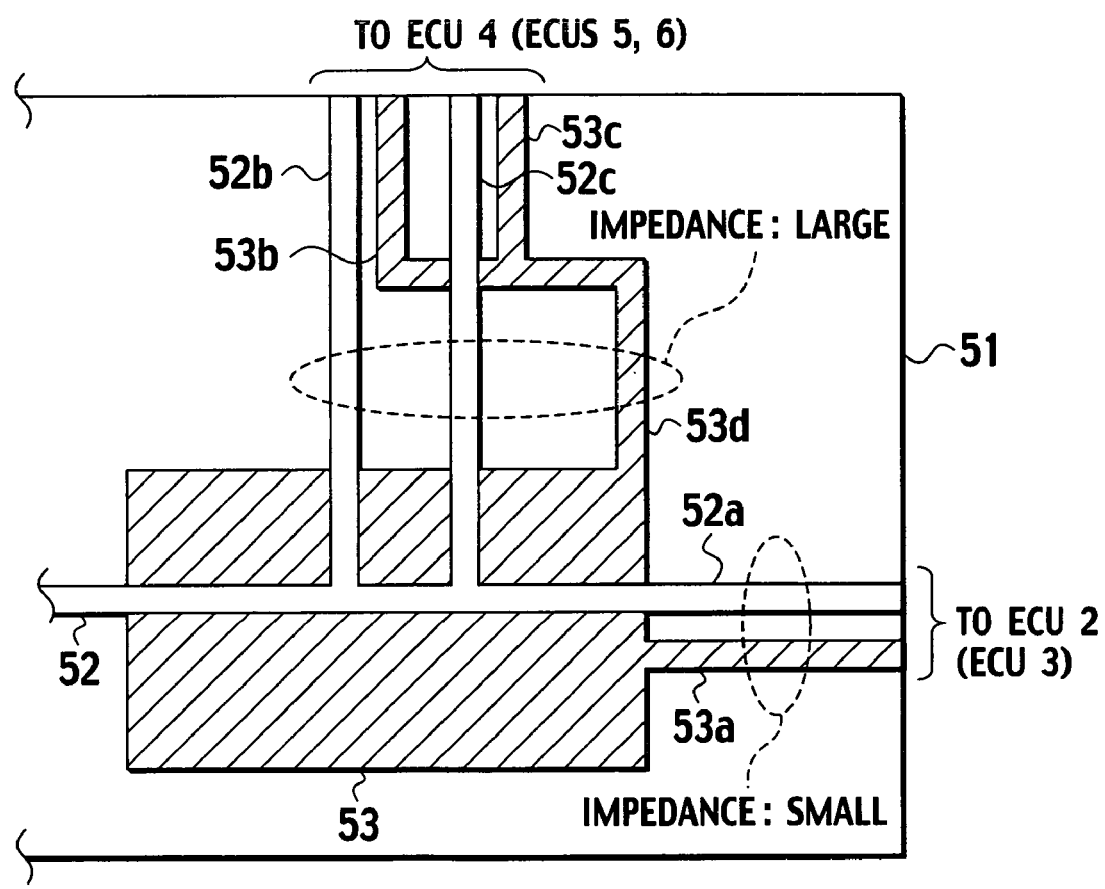
FIG. 3 is a view explaining a structure of a base plate that a master ECU includes, in accordance with a second modification of the present invention.

FIG. 3 is a view showing a second modification of the embodiment, illustrating a wiring pattern of a base plate 51 built in the master ECU 1. As shown in the figure, a power-supply pattern 52 and a grounding pattern 53 are formed in the base plate 51. A branch pattern 52a branching off from the power-supply pattern 52 and a branch pattern 53a branching off from the grounding pattern 53 are together connected to the ECUS 2, 3 performing PLC transmission method. While, two branch patterns 52b, 52c branching off from the power-supply pattern 52 and two branch patterns 53b, 53c branching off from the grounding pattern 53 are together connected to the ECUS 4~6 performing no PLC transmission method.

Here, it is noted that a branch pattern 53d connecting the grounding pattern 53 with the branch patterns 53b, 53c is positioned apart from the branch patterns 52b, 52c branching off from the power-supply pattern 52.

While, an interval between the branch pattern 53a from the grounding pattern 53 and the branch pattern 52a from the power-supply pattern 52 is established narrower than an interval between the branch pattern 53d from the grounding pattern 53 and the branch pattern 52b (or the branch pattern 52c).

Thus, impedance of the branch patterns 52a, 53a gets smaller than impedance of the branch patterns 52b, 53d and also impedance of the branch patterns 52c, 53d. As a result, since a transmission channel for the ECUS 2, 3 performing PLC transmission method has impedance smaller than that of another transmission channel for the ECUS 4~6 performing no PLC transmission method, it is possible to improve the transmission efficiency of the control signals.

The present invention is not limited to the shown embodiments only. The shown constituents of the PLC system may be replaced by optional elements having similar effects to those of the constituents.

For instance, although the power-supply lines 7b performing no PLC transmission method are connected to the ECUS 4~6 in the above-mentioned embodiment, the same lines 7b may be directly connected to in-vehicle loads, such as motor and lamps.

In the above-mentioned embodiment, the PLC system of the present invention is described by citing the example of communication among in-vehicle ECUS. However, the present invention is not limited to this but applicable to the other communication.

It goes without saying that the present invention is remarkably effective in view of reducing power consumption of the system and performing PLC transmission method with high accuracy.

Again, it will be understood by those skilled in the art that the foregoing descriptions are nothing but one embodiment of the disclosed PLC system and the modifications.

What is claimed is:

1. A power line communication system comprising:
a master station for supplying electric power;
a plurality of slave stations driven by the electric power; and
a plurality of power-supply lines connecting the slave stations to the master station respectively, the power-supply lines including at least one first power-supply line on which a control signal is superimposed and at least one second power-supply line on which no control signal is superimposed,
wherein the control signal is superimposed on the first power-supply line by the master station and also communicated between the master station and at least one slave station connected to the first power-supply line, and
impedance per unit length of the first power-supply line is set smaller than impedance per unit length of the second power-supply line.

2. The power line communication system as claimed in claim 1, wherein,
each of the power-supply lines comprises two wires forming a power line and a grounding line, and
the first power-supply line is wired so that an interval between the power line and the grounding line of the first power-supply line is smaller than an interval between the power line and the grounding line of the second power-supply line.

3. The power line communication system as claimed in claim 1, wherein,
each of the power-supply lines comprises two wires forming a power line and a grounding line and interposes a connector arranged in at least one position in a wiring route between the master station and each of the slave stations, the connector having a number of connect pins, and
an interval between the connect pin for the power line and the connect pin for the grounding line in the connector interposed in the first power-supply line is smaller than an interval between the connect pin for the power line and the connect pin for the grounding line in the connector interposed in the second power-supply line.

4. The power line communication system as claimed in claim 1, wherein,
each of the power-supply lines comprises two wires forming a power line and a grounding line,
the master station includes a base plate provided with wiring patterns of the power-supply lines connecting the master station with the slave stations, and
an interval between the power line and the grounding line in the wiring pattern associated with the first power-supply line is smaller than an interval between the power line and the grounding line in the wiring pattern associated with the second power-supply line.

5. The power line communication system as claimed in claim 1, wherein,
each of the power-supply lines comprises two wires forming a power line and a grounding line, and
the grounding line of the second power-supply line is formed by a vehicle body.

6. The power line communication system as claimed in claim 1, wherein,
the master station is formed by an in-vehicle electronic control unit, and
the slave stations are formed by either loads or load control units, which are driven by the electric power supplied from the in-vehicle electronic control unit through the power-supply lines.

7. The power line communication system as claimed in claim 6, wherein,
the first power-supply lines comprises two wires forming a power line and a grounding line, and
the second power-supply line comprises a power line and a grounding line using a vehicle body.

* * * * *

UNITED STATES PATENT AND TRADEMARK OFFICE
CERTIFICATE OF CORRECTION

PATENT NO. : 7,460,934 B2  Page 1 of 1
APPLICATION NO. : 11/370931
DATED : December 2, 2008
INVENTOR(S) : Yo Yanagida et al.

It is certified that error appears in the above-identified patent and that said Letters Patent is hereby corrected as shown below:

In claim 7, column 8, line 46, "lines" should read --line--.

Signed and Sealed this

Twenty-fourth Day of March, 2009

JOHN DOLL
*Acting Director of the United States Patent and Trademark Office*